US011954229B1

(12) United States Patent
Henderson et al.

(10) Patent No.: US 11,954,229 B1
(45) Date of Patent: Apr. 9, 2024

(54) IDENTITY RESOLUTION AND DATA ENRICHMENT APPLICATION FRAMEWORK

(71) Applicant: Snowflake Inc., Bozeman, MT (US)

(72) Inventors: Marcus A. Henderson, San Marcos, CA (US); Justin Langseth, Kailua, HI (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/161,030

(22) Filed: Jan. 27, 2023

Related U.S. Application Data

(60) Provisional application No. 63/477,601, filed on Dec. 29, 2022.

(51) Int. Cl.
  *H04L 29/06* (2006.01)
  *G06F 16/22* (2019.01)
  *G06F 21/62* (2013.01)

(52) U.S. Cl.
  CPC ...... *G06F 21/6245* (2013.01); *G06F 16/2255* (2019.01)

(58) Field of Classification Search
  CPC .......................... G06F 21/6245; G06F 16/2255
  USPC .................................................... 726/28
  See application file for complete search history.

(56) References Cited

U.S. PATENT DOCUMENTS

| | | | |
|---|---|---|---|
| 9,397,983 | B2 | 7/2016 | Moffat |
| 10,044,654 | B2 | 8/2018 | Papa et al. |
| 2018/0159884 | A1* | 6/2018 | Meier ................ H04L 63/1425 |
| 2018/0349894 | A1 | 12/2018 | Patrinos et al. |
| 2019/0258820 | A1 | 8/2019 | Gaspar et al. |
| 2020/0137058 | A1 | 4/2020 | Allen et al. |
| 2020/0336489 | A1* | 10/2020 | Wuest .................. H04L 63/102 |

(Continued)

FOREIGN PATENT DOCUMENTS

| | | |
|---|---|---|
| CN | 113015138 | 6/2021 |
| JP | 2004-302623 A | 10/2004 |
| WO | 02073456 | 9/2002 |

OTHER PUBLICATIONS

"U.S. Appl. No. 18/162,696, Preliminary Amendment filed Feb. 2, 2023", 12 pgs.

(Continued)

*Primary Examiner* — Jeffrey C Pwu
*Assistant Examiner* — Nega Woldemariam
(74) *Attorney, Agent, or Firm* — Schwegman Lundberg & Woessner, P.A.

(57) ABSTRACT

A method for identity resolution and data enrichment is performed by at least one hardware processor and includes detecting at an account of a data provider, a shared data object that is shared by an account of a data consumer with the account of the data provider. An application executing at the account of the data consumer is enabled for an identity resolution process based on the detecting of the shared data object. A request for source data received from the application is detected at the account of the data provider. The source data is managed by the account of the data provider. The source data is communicated to the application executing at the account of the data consumer, based on a verification that the application is enabled for the identity resolution process. The identity resolution process is performed at the account of the data consumer using the source data.

24 Claims, 8 Drawing Sheets

(56) References Cited

U.S. PATENT DOCUMENTS

2021/0385069 A1    12/2021  Reid et al.
2022/0365789 A1*   11/2022  Oikawa .................. G06F 9/445

OTHER PUBLICATIONS

"U.S. Appl. No. 18/162,696, Notice of Allowance dated Apr. 26, 2023", 14 pgs.
"U.S. Appl. No. 18/321,974, Notice of Allowance dated Aug. 16, 2023", 14 pages.
"U.S. Appl. No. 18/162,696, Notice of Allowance dated Oct. 18, 2023", 5 pages.
U.S. Appl. No. 18/162,696, filed Jan. 31, 2023, Identity Resolutioin and Data Enrichment Application Framework Using Shared Data Objects (As Amended).
U.S. Appl. No. 18/497,205, filed Oct. 30, 2023, Identity Resolution and Data Enrichment Application Framework.
U.S. Appl. No. 18/321,974, filed May 23, 2023, Identity Resolution and Data Enrichment Application Framework.

* cited by examiner

IDENTITY RESOLUTION AND DATA ENRICHMENT APPLICATION FRAMEWORK

PRIORITY CLAIM

This application claims the benefit of priority to U.S. Provisional Patent Application 63/477,601, filed Dec. 29, 2022, and entitled "IDENTITY RESOLUTION AND DATA ENRICHMENT APPLICATION FRAMEWORK," which application is incorporated herein by reference in its entirety.

TECHNICAL FIELD

Embodiments of the disclosure relate generally to databases and, more specifically, to an identity resolution and data enrichment application framework that can be used in a cloud computing platform.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Different database storage systems may be used for storing different types of content, such as bibliographic, full text, numeric, and/or image content. Further, in computing, different database systems may be classified according to the organizational approach of the database. There are many different types of databases, including relational databases, distributed databases, cloud databases, object-oriented and others.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, client (or user) information (e.g., personally identifiable information, or PII) in that same or a different database. Example PII includes client names, client contact information, client address, customer relationship management (CRM) data, and so forth. Based on different PII usage scenarios, the retail company may need to perform identity resolution and data enrichment of the client's PII. However, existing techniques for performing identity resolution and data enrichment are time-consuming and challenging to configure and perform securely.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
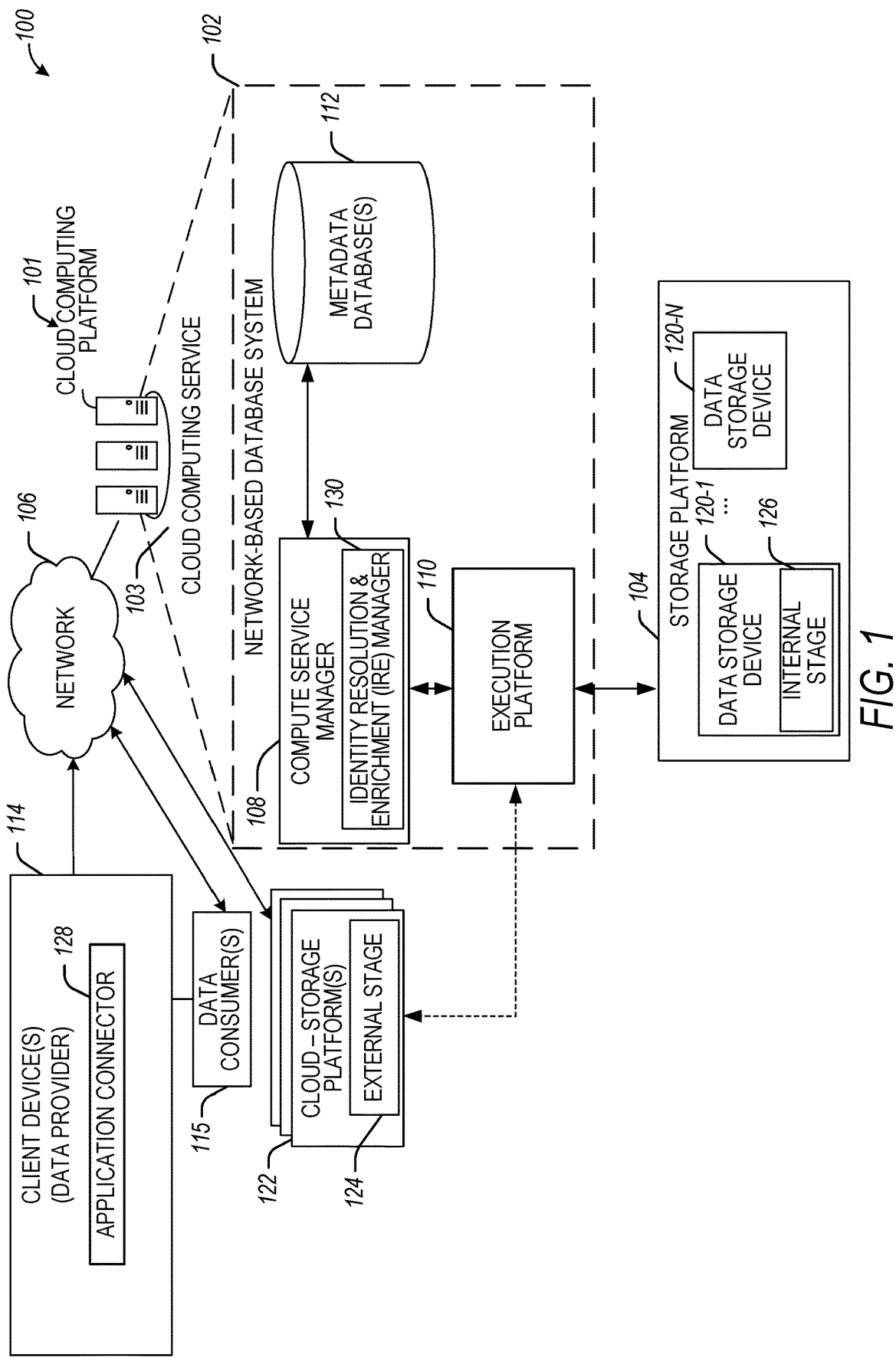
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other examples of unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

As used herein, the term "view" indicates a named SELECT statement, conceptually similar to a table. In some aspects, a view can be secure, which prevents queries from getting information on the underlying data obliquely. As used herein, the term "materialized view" indicates a view that is eagerly computed rather than lazily (e.g., as a standard view). In some aspects, the implementation of materialized views has overlapped with change tracking functionality. As used herein, the term "stream" refers to a table and a timestamp. In some aspects, a stream may be used to iterate over changes to a table. When a stream is read inside a Data Manipulation Language (DML) statement, its timestamp may be transactionally advanced to the greater timestamp of its time interval.

As used herein, the term "identity resolution" refers to the process of matching fragments of personally identifiable information (PII) across devices and touchpoints to a single profile, often a person or a household. This profile aids in building a cohesive, multi-channel view of a consumer. An identity resolution process can generate a secure identifier (e.g., a secure key) of the person or household (e.g., a key or set of keys that represents a different component of an identity). As used herein, the term "data enrichment" refers to a process of obtaining additional data (e.g., demographic data) related to (and supplementing) an existing set of data (e.g., an existing set of PII).

As used herein, the term "task" indicates an object (e.g., a data object) that can execute (e.g., user-managed or managed by a network-based database system) any one of the following types of SQL code: a single SQL statement, a call to a stored procedure, and procedural logic using scripting.

Figure 2:
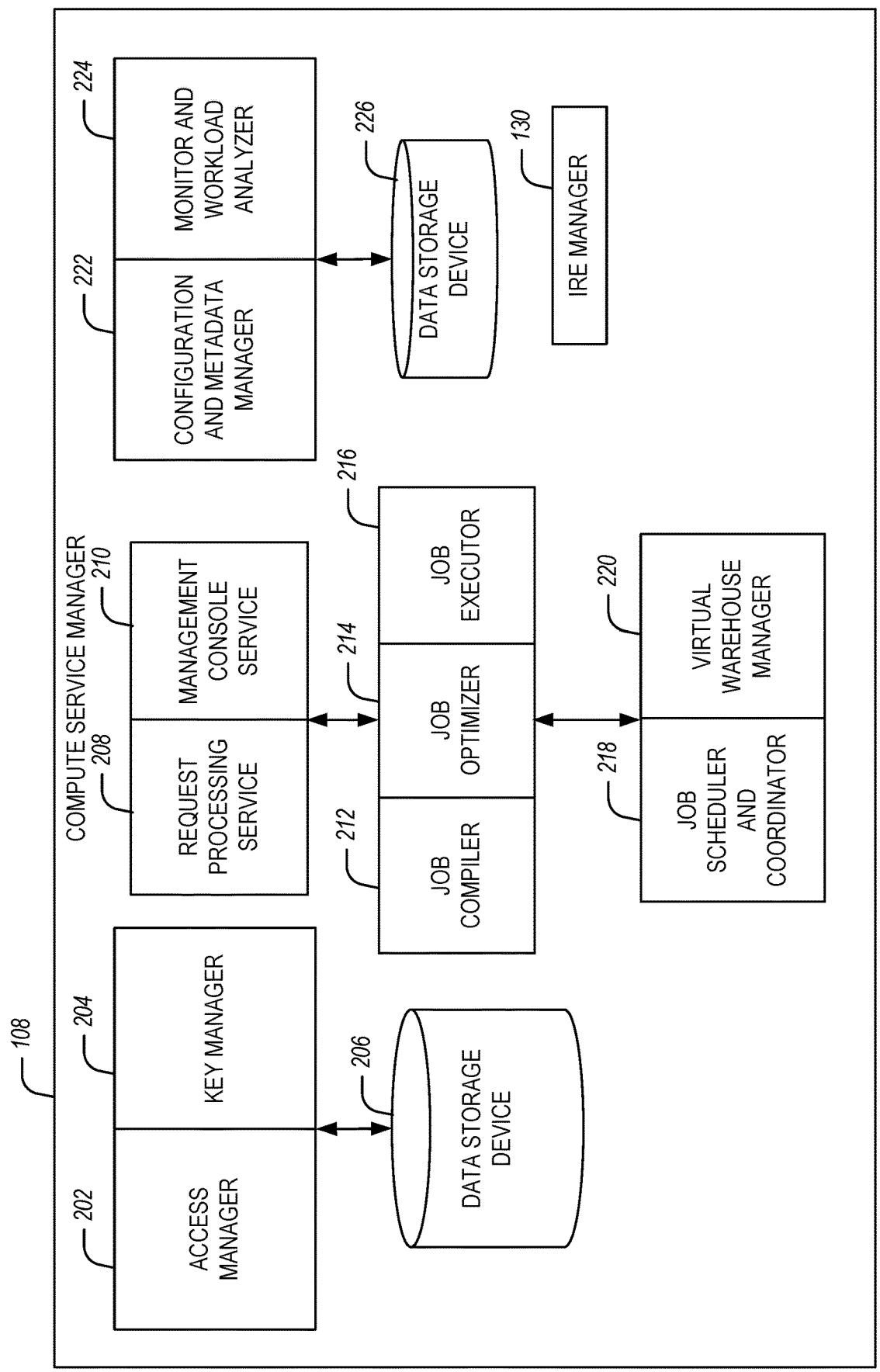
FIG. 2 is a block diagram illustrating the components of a compute service manager using an identity resolution and enrichment (IRE) manager, in accordance with some embodiments of the present disclosure.
Figure 3:
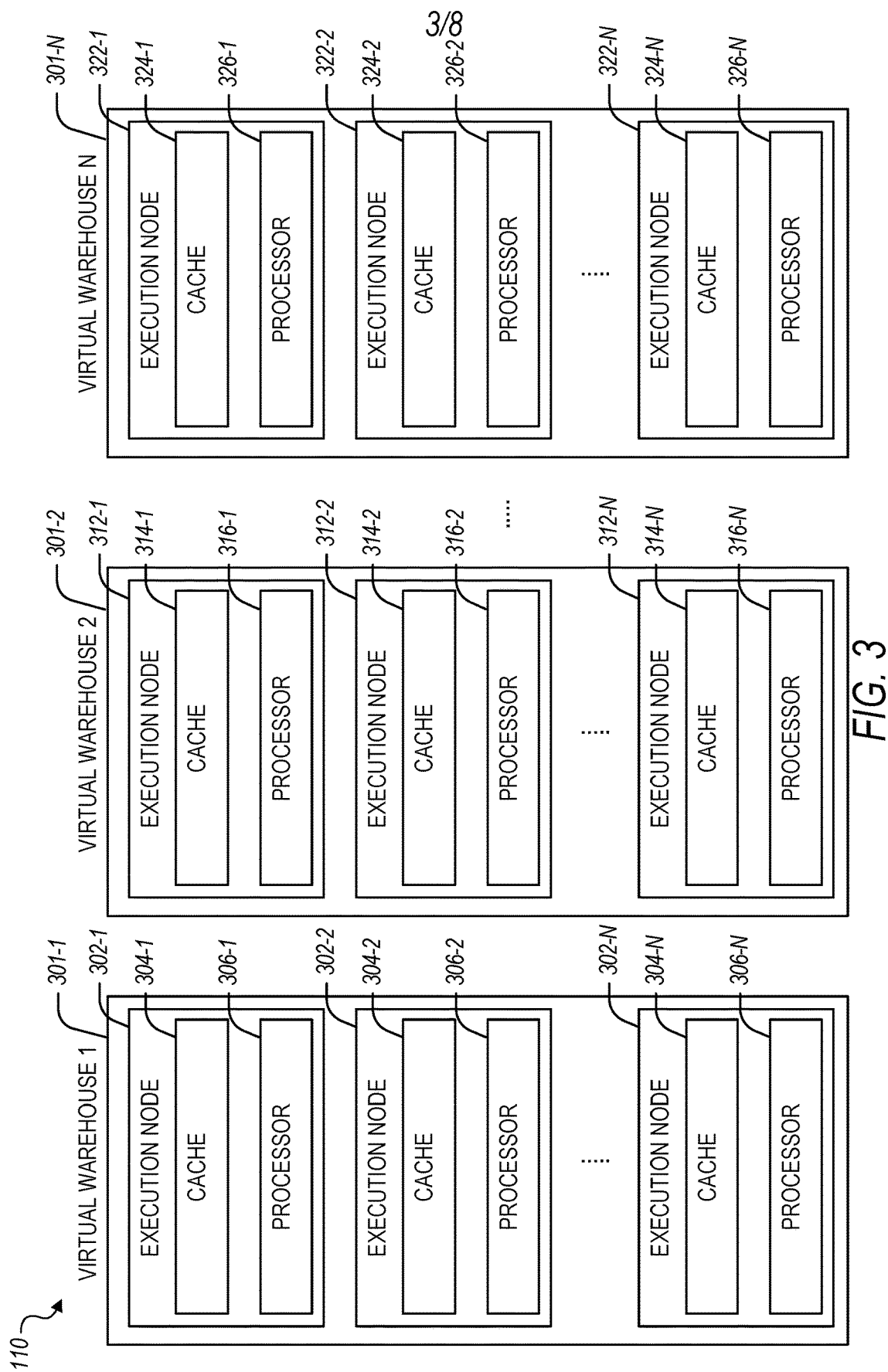
FIG. 3 is a block diagram illustrating components of an execution platform, in accordance with some embodiments of the present disclosure.

In some aspects, the disclosed identity resolution and data enrichment functionalities can exist in a network-based database system (e.g., as illustrated in FIGS. 1-3) or can be leveraged using an existing API (e.g., via one or more external functions). More specifically, the disclosed identity resolution and data enrichment techniques are built on top of a native applications framework, which allows a data provider to build an application that data consumers can "install" in their database system accounts to use. Example features of the network-based database system which can be used in connection with identity resolution and data enrichment include configuring and using secure functions, data sharing, data streams (also referred to as streams), and tasks. Such features can work in concert to automate one or more aspects of the identity resolution and data enrichment functionalities.

The disclosed techniques can be used for configuring an identity resolution and enrichment (IRE) manager to perform identity resolution and data enrichment functionalities using an application framework. There are two parties in an identity resolution process—a data provider (also referred to as provider) and a data consumer (also referred to as consumer). The data consumer has a data set with PII which needs identity resolution. The data provider can provide proprietary functionality that accomplishes identity resolution for identity information (e.g., PII of a user) available at the data consumer. Both the data consumer and the data provider can be tenants (or subscribers) of services provided by the network-based database system (e.g., services that can include the disclosed identity resolution and data enrichment functionalities of the IRE manager). In this regard, access to one or more of the disclosed identity resolution and data enrichment functionalities provided by an IRE manager can be configured (or enabled) in an account of the data provider or the data consumer at the network-based database system. In some aspects, deployment of the identity resolution framework associated with the IRE manager consists of creating secure objects and data shares in the accounts of the data consumer and data provider at the network-based database system. The framework can be flexible enough to incorporate additional identity resolution and data enrichment functionalities, as needed. In some aspects, the framework can be deployed across two accounts on the same cloud provider and region. In the event the parties are on different providers or regions, one of the parties can replicate their data/objects to the other party's provider or region.

The disclosed identity resolution and data enrichment techniques can be used to replace slower and often less secure existing identify resolution and data enrichment methods, including compiling desired data, writing that data to a flat, delimited file, then uploading that file to a secure file transfer protocol (sFTP) site. Once received, the data provider copies the file, processes the data, and returns an output file to the sFTP location, for the requesting party to download. Once downloaded, the requesting party has to ingest the results into databases.

The disclosed identity resolution and data enrichment techniques also replace the "embedded" solution where the provider's resolution/enrichment logic resides in the provider account in the database system, but involves using streams/tasks to automate the request/response processes. Some drawbacks of this approach include the following: the consumer has to share their data with the provider, and the provider incurs compute costs for each request from the consumer.

Configuring the disclosed techniques using a native applications framework (e.g., an application (or app) of the data provider configured to execute at the account of the data consumer) resolves both of the above drawbacks since the consumer no longer has to share data with the provider, and the consumer incurs compute with each request. Some additional advantages of the disclosed techniques include the following: (a) the app can write to the database in the account of the data consumer; (b) the account of the data provider determines which objects in the database are visible to the app executing in the account of the data consumer; (c) the provider's data continues to be hidden from the consumer; (d) the provider's data is only shared with the app; (e) the consumer no longer has to share their PII data directly with the provider; (f) the provider no longer has to create streams on consumer data and tasks to process requests from the consumer (e.g., the consumer can make requests on demand via the app, and results are generated faster, with the absence of provider tasks); (g) the provider passes the compute costs to the consumer; (h) the disclosed techniques can be integrated with data clean rooms to offer identity resolution "on-the-fly".

The various embodiments that are described herein are described with reference where appropriate to one or more of the various figures. An example computing environment using an IRE manager for configuring identity resolution and data enrichment functionalities is discussed in connection with FIGS. 1-3. Example stream-related configurations which can be used with the disclosed identity resolution and data enrichment functions are discussed in connection with FIG. 4. Example identity resolution and data enrichment frameworks are discussed in connection with FIGS. 5-7. A more detailed discussion of example computing devices that may be used in connection with the disclosed techniques is provided in connection with FIG. 8.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, and storage platform 104 (also referred to as cloud storage platforms). The cloud computing platform 101 provides computing resources and storage resources that may be acquired (purchased) or leased (e.g., by data providers and data consumers), and configured to execute applications and store data.

The cloud computing platform 101 may host a cloud computing service 103 that facilitates storage of data on the cloud computing platform 101 (e.g., data management and access) and analysis functions (e.g. SQL queries, analysis), as well as other processing capabilities (e.g., performing identity resolution and data enrichment functions described herein). The cloud computing platform 101 may include a three-tier architecture: data storage (e.g., storage platforms 104 and 122), an execution platform 110 (e.g., providing query processing), and a compute service manager 108 providing cloud services (e.g., identity resolution and data enrichment services provided by the IRE manager 130).

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a user stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage), client device 114 (e.g., a data provider), and data consumer 115 via network 106. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services (as well as additional services such as the disclosed identity resolution and data enrichment functions) to multiple client accounts, including an account of the data provider associated with client device 114 and an account of the data consumer 115. In some embodiments, the compute service manager 108 comprises the IRE manager 130 which can configure and provide the identity resolution and data enrichment functions to accounts of tenants of the network-based database system 102 (e.g., an account of the data provider associated with client device 114 and an account of the data consumer 115). A more detailed description of the identity resolution and data enrichment functions provided by the IRE manager 130 is provided in connection with FIGS. 4-7.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, accounts of data providers, accounts of data consumers, system administrators managing the systems and methods described herein, and other components/devices that interact with the compute service manager 108.

The compute service manager 108 is also in communication with a client device 114. The client device 114 corresponds to a user of one of the multiple client accounts (e.g., a data provider) supported by the network-based database system 102. The data provider may utilize application connector 128 at the client device 114 to submit data storage, retrieval, and analysis requests to the compute service manager 108 as well as to access other services provided by the compute service manager 108 (e.g., identity resolution and data enrichment functions). Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 114 operated by such users. For example, a notification to a user may be understood to be a notification transmitted to client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some aspects, a data consumer 115 can communicate with the client device 114 to access functions offered by the data provider. Additionally, the data consumer can access functions (e.g., identity resolution and data enrichment functions) offered by the network-based database system 102 via network 106.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

The compute service manager 108 is further coupled to the execution platform 110, which provides multiple computing resources (e.g., execution nodes) that execute, for example, various data storage, data retrieval, and data processing tasks. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology.

Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, communication links between elements of the computing environment 100 are implemented via one or more data communication networks, such as network 106. These data communication networks may utilize any communication protocol and any type of communication medium. In some embodiments, the data communication networks are a combination of two or more data communication networks (or sub-Networks) coupled with one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platforms 104 and 122 may be implemented as a distributed system (e.g., distributed across multiple systems/platforms at multiple geographic locations). Additionally, each of the compute service manager 108, metadata database(s) 112, execution platform 110, and storage platforms 104 and 122 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

FIG. 2 is a block diagram illustrating components of the compute service manager 108, in accordance with some embodiments of the present disclosure. As shown in FIG. 2, the compute service manager 108 includes an access manager 202 and a key manager 204 coupled to a data storage device 206, which is an example of the metadata database(s) 112. Access manager 202 handles authentication and authorization tasks for the systems described herein. The key manager 204 facilitates the use of remotely stored credentials (e.g., credentials stored in one of the remote credential stores) to access external resources such as data resources in a remote storage device. As used herein, the remote storage devices may also be referred to as "persistent storage devices" or "shared storage devices." For example, the key manager 204 may create and maintain remote credential store definitions and credential objects (e.g., in the data storage device 206). A remote credential store definition identifies a remote credential store (e.g., one or more of the remote credential stores) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the key manager 204 and access manager 202 use information stored in the data storage device 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes configuration and metadata manager 222, which manages the information related to the data stored in the remote data storage devices and the local buffers (e.g., the buffers in the execution platform 110). Configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing query A should not be allowed to request access to data source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

In some embodiments, the compute service manager 108 further includes the IRE manager 130 which can configure and provide the identity resolution and data enrichment functions to accounts of tenants of the network-based database system 102 (e.g., an account of the data provider associated with client device 114 and an account of the data consumer 115). A more detailed description of the identity resolution and data enrichment functions provided by the IRE manager 130 is provided in connection with FIGS. 4-7.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although each of the execution nodes shown in FIG. 3 includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, N may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
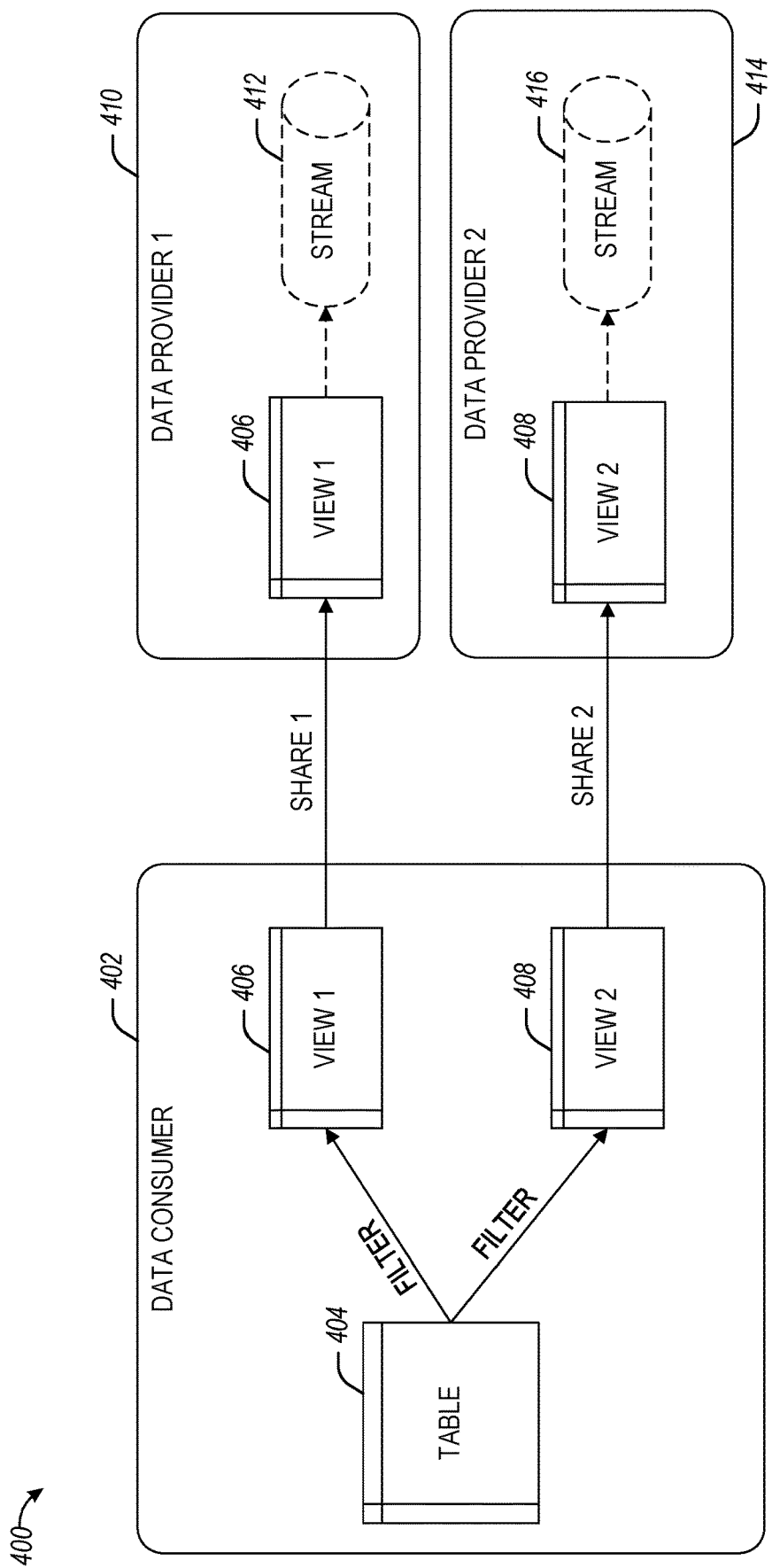
FIG. 4 is a diagram of shared views, in accordance with some embodiments of the present disclosure.

FIG. 4 is a diagram 400 of shared views, in accordance with some embodiments of the present disclosure. In some aspects, a shared view or a stream (e.g., a stream on a view or a stream on a table) can be used by the IRE manager 130 in connection with identity resolution and data enrichment functionalities performed in an account of a data consumer and an account of a data provider. The terms "stream" and "stream object" are used interchangeably.

Referring to FIG. 4, a data consumer 402 manages a source table 404 (e.g., a source table with PII). The data consumer 402 can apply different filters to source table 404 to generate views 406 and 408. For example, data consumer 402 can apply different filters to source table 404 so that different PII from the table is shared with different data providers (e.g., data providers 410 and 414) in connection with identity resolution or data enrichment, based on specific privacy requirements of each of the data providers. In this regard, view 406 is shared with data provider 410, and view 408 is shared with data provider 414. In some embodiments, IRE manager 130 configures streams 412 and 416 on corresponding views 406 and 408 for consumption by data providers 410 and 414 or use during identity resolution or data enrichment.

The definition of a view can be complex but observing the changes to such a view may be useful independently of its complexity. Manually constructing a query to compute those changes may be achieved, but can be toilsome, error-prone, and suffer from performance issues. In some aspects, a change query on a view may automatically rewrite the view query, relieving users of this burden. In some aspects, simple views containing only row-wise operators (e.g., select, project, union all) may be used. In some aspects, complex views that join fact tables with (potentially several) slowly-changing-dimension (DIM) tables may also be used. Other kinds of operators like aggregates, windowing functions, and recursion may also be used in connection with complex views.

Figure 5:
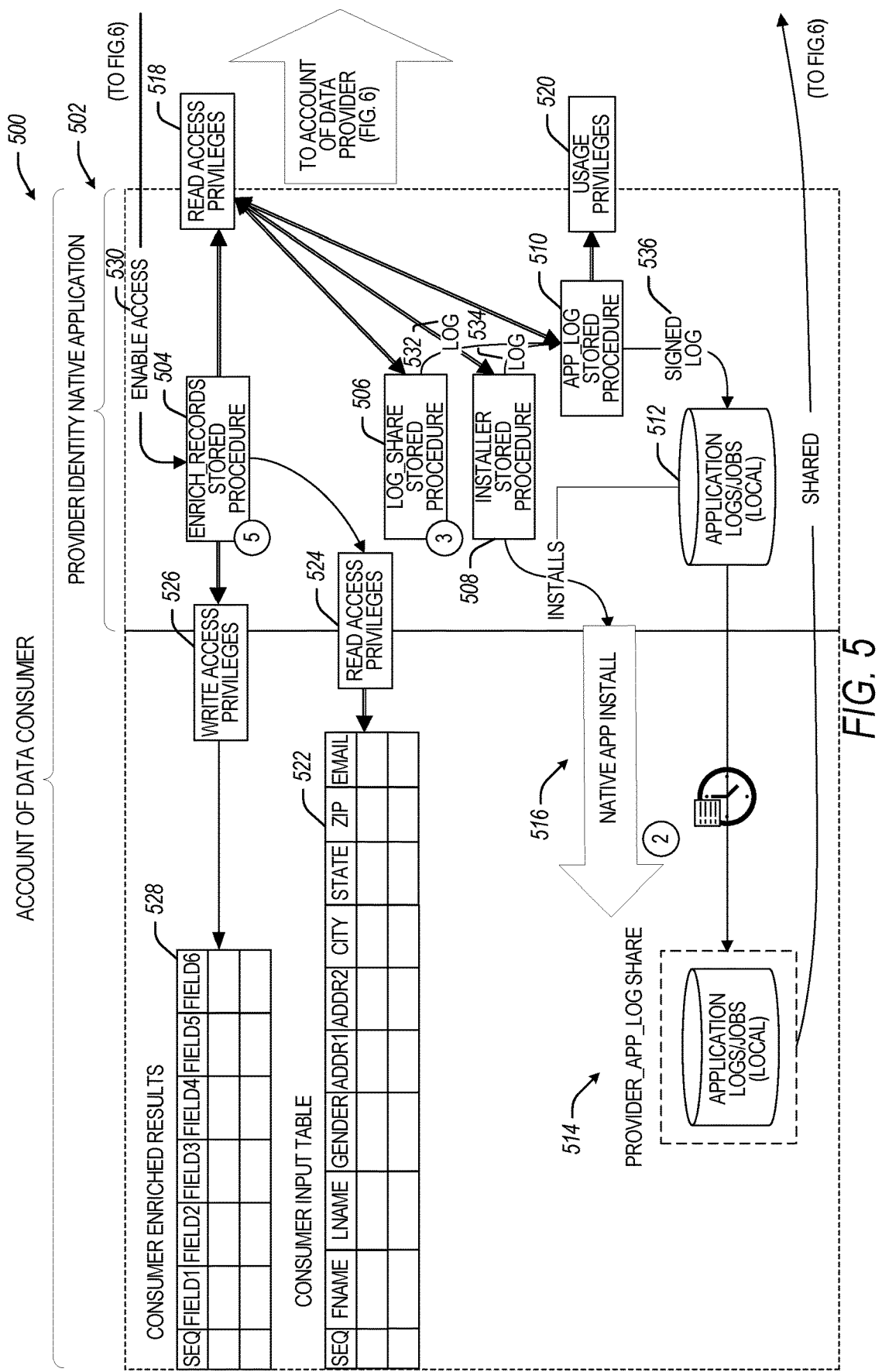
FIG. 5 is a block diagram illustrating identity resolution and data enrichment functions performed at an account of a data consumer, in accordance with some embodiments of the present disclosure.
Figure 6:
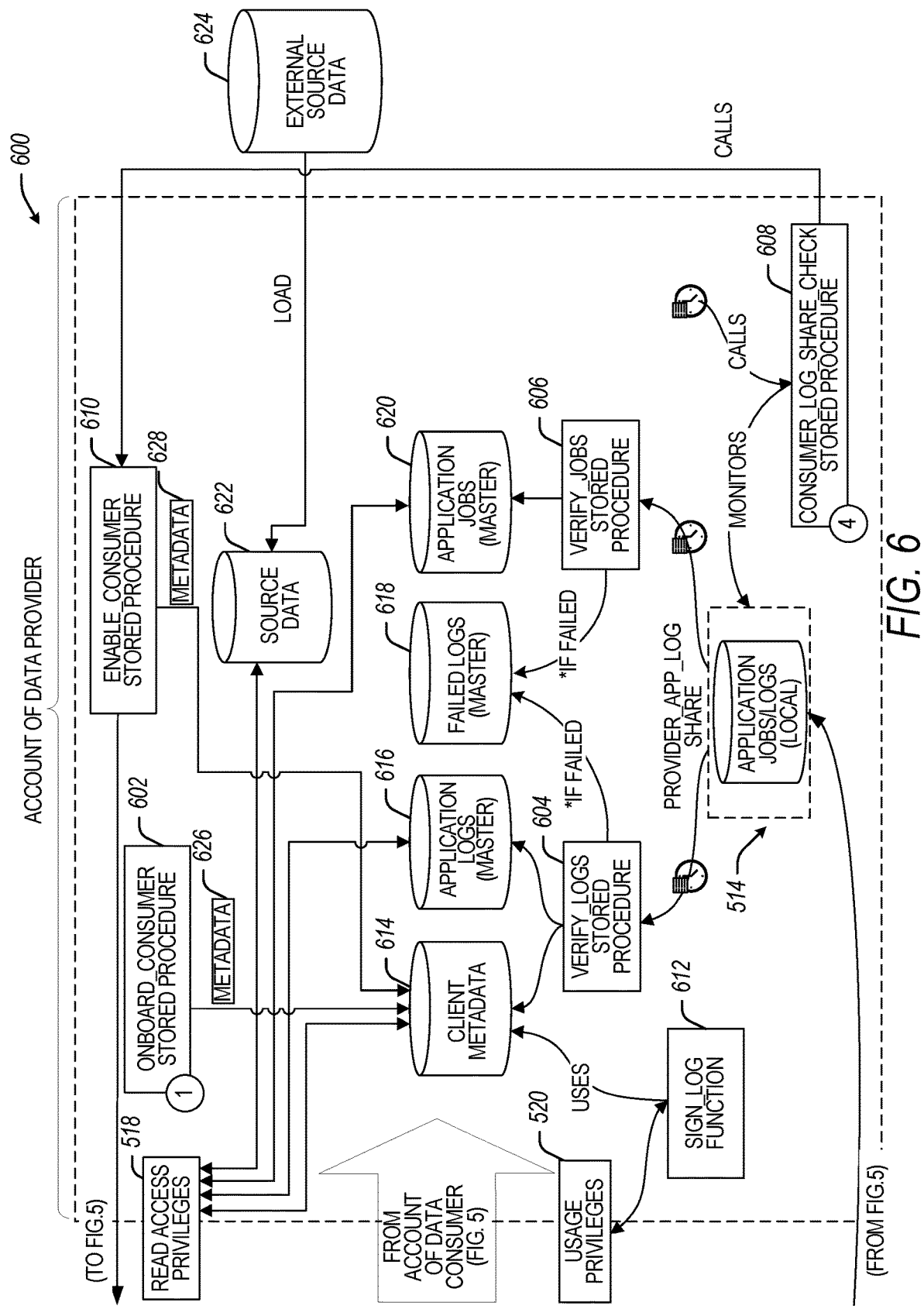
FIG. 6 is a block diagram illustrating identity resolution and data enrichment functions performed at an account of a data provider, in accordance with some embodiments of the present disclosure.

FIG. 5 is a block diagram illustrating identity resolution and data enrichment functions performed at account 500 of a data consumer (also referred to as consumer account 500), in accordance with some embodiments of the present disclosure. FIG. 6 is a block diagram illustrating identity resolution and data enrichment functions performed at account 600 of a data provider (also referred to as provider account 600), in accordance with some embodiments of the present disclosure.

Deployment of the identity resolution framework of FIGS. 5-6 consists of creating stored procedures, secure objects, and data shares in the consumer account 500 and the provider account 600. The framework can be flexible enough to incorporate additional functionality, as required. The framework can be deployed across two accounts on the same cloud provider and region. In the event the data provider and the data consumer are on different providers or regions, one of the parties can replicate their data/objects to the other party's provider or region.

Identity resolution and data enrichment functions performed at accounts 500 and 600 can be configured by the IRE manager 130. In some aspects, the IRE manager 130 can configure an application of the provider (e.g., provider identity native application 502) to execute at the consumer account 500.

In some aspects, application 502 (or app 502) is configured to enhance secure data sharing by allowing the provider to create local state objects (e.g., tables) and local compute objects (e.g., stored procedures, external functions, and tasks) in addition to sharing objects representing the application logic in the consumer account 500.

For example and as illustrated in FIG. 5 and FIG. 6, the IRE manager 130 can configure the following stored procedures to execute at the provider account 600: onboard_consumer stored procedure 602, verify_logs stored procedure 604, verify_jobs stored procedure 606, consumer_log_share_check stored procedure 608, and enable_consumer stored procedure 610. The IRE manager 130 can also configure the provider account 600 with a sign_log function 612, client metadata storage 614, application logs storage 616, failed logs storage 618, application jobs storage 620, and source data 622. The IRE manager 130 can configure the following stored procedures to execute as part of app 502 within the consumer account 500: enrich_records stored procedure 504, log_share stored procedure 506, installer stored procedure 508, and app_log stored procedure 510. The above-listed stored procedures configured at the consumer account 500 and the provider account 600 are explained in greater detail herein below.

App 502 can be configured (e.g., by the IRE manager 130) to allow data providers to control the accessibility of objects with their data consumers. App 502 can be installed in the consumer account 500 as a database, similar to secure data sharing. The provider can create an application that consists of stored procedures and/or external functions (e.g., as listed above) that resolve and/or enrich data in the consumer account 500. For example, a consumer "installs" app 502 in the consumer account 500 as a database. Once installed, the consumer can call stored procedures in the application that provide the application identity resolution and enrichment functionalities discussed herein to resolve/enrich their data, on-demand, and without having to share their data with the provider account 600.

In some aspects, the provider can make the app 502 available to consumer accounts (e.g., consumer account 500) through either direct secure data sharing or through a private listing (e.g., a listing in a data exchange specifying particular consumer accounts allowed to download and use the app). Once added to the listing, the consumer executes an app script (e.g., a publisher's "helper" script) to create a role, warehouse, and stored procedures to streamline the app usage.

Example processing operations for performing identity resolution and enrichment functions using the app 502 are referenced as operations 1-5 in FIGS. 5-6.

At operation 1, the provider will onboard the consumer for the usage of the provider app 502 by calling the onboard_consumer stored procedure 602. The onboard_consumer stored procedure 602 adds consumer values (e.g., as metadata 626), including record limit and interval, to a metadata table stored in the client metadata storage 614. In addition, the procedure also creates a dedicated warehouse, schema, secure view to view jobs, and a task to call the consumer_log_share_check stored procedure 608 to check for a share (e.g., share 514) from the consumer account 500. In some embodiments, the onboard_consumer stored procedure 602 can be expanded to include additional metadata values.

In some aspects, the onboard_consumer stored procedure 602 can be of JavaScript type. In some aspects, onboard_consumer stored procedure 602 can be configured to use the following parameters:
  (a) account_locator (VARCHAR)—a locator for the consumer account 500;
  (b) consumer_name (VARCHAR)—the consumer's company name;
  (c) request_record_limit (FLOAT)—the limit on the number of unique records the consumer can enrich within the given request_limit_interval; and
  (d) request_limit_interval (VARCHAR)—the time interval in which requests are limited (i.e., "1 day").

During the onboarding process, the provider creates a share (e.g., share 514 in the provider account 600) for the consumer. The consumer can create a database (e.g., application log database 512) from the provider's share (created during initial setup). The consumer can add the provider account 600 to their outbound share (e.g., share 514 in the consumer account 500). Once the consumer has added the provider account to their outbound share, the provider can automatically enable the consumer (e.g., enable access 530 to resolution/enrichment functions of the app 502 via the enable_consumer stored procedure 610). The metadata table in the client metadata storage 614 can be used to check whether the enabled key has been switched to YES (or Y).

In some aspects, the application 502 framework's enablement and usage limits can be enforced via the metadata table stored in the client metadata storage 614. In some aspects, the table structure utilizes key/value pairs for each customer account, which allows the provider to create and manage consumer metadata keys, as desired. In some aspects, the following metadata keys can be stored for each consumer:

(a) consumer_name—the consumer's company name;
  (b) enabled—a flag indicating whether the consumer has been enabled to use the identity resolution/enrichment service of the provider;
  (c) requests count—the number of resolution or enrichment requests made by the consumer;
  (d) last request timestamp—timestamp of the last resolution or enrichment request made by the consumer;
  (e) record request_limit—the number of unique enriched/resolved records allowed to the consumer (over an interval specified below);
  (f) request_limit_interval—the interval at which the consumer is allowed to make the specified volume of unique requests; and
  (g) request_record counter—the number of records the consumer has currently enriched/resolved during the allotted period (this counter can be reset to 0 at the allotted period, i.e., at 00:00:00 UTC daily).

In some aspects, the stored metadata can be extended (e.g., by the IRE manager 130) to track additional details and enforce additional limits as needed. In the event additional metadata keys are needed, the following stored procedures are updated accordingly: the onboard_consumer stored procedure 602 (if metadata values should be added during onboarding), the enable_consumer stored procedure 610 (if metadata values should be added/modified during onboarding), the enrich_records stored procedure 504 (if metadata values relate to any request-related events), the verify_logs stored procedure 604 (if metadata values relate to any install/request related events), and the verify_jobs stored procedure 606 (if metadata values relate to any request-related events).

At operation 2, the consumer can perform a native app installation 516 of app 502 in the consumer account 500. For example, the installer stored procedure 508 is executed, which installs the app 502 in the consumer account 500 and also creates the local app log table and metadata view (e.g., application log database 512) that displays the consumer's metadata, as stored in the provider account 600.

Similar to the shared procedures, this stored procedure is created to execute with owner rights. To make objects shared to the shared database role visible to the consumer, the shared database role is granted to the app's APP_EXPORTER role. Any objects (i.e., source data) that should not be visible to the consumer may not perform this step.

At operation 3, the consumer account 500 calls the provision_provider app helper stored procedure to provision the app 502 and create a log data share (e.g., share 514) via the app's log_share stored procedure 506 to the provider to share the application logs (e.g., the logs stored in the application log database 512).

At operation 4, the provider account 600 uses the consumer_log_share_check stored procedure 608 to check for shared app logs via share 514. Once a shared app log has been detected, the enable_consumer stored procedure 610 is activated to enable access by the consumer account 500 to resolution/enrichment functions of the app 502. Metadata 628 (e.g., an enable flag) can be stored in the metadata table in the client metadata storage 614 after the access is enabled by the enable_consumer stored procedure 610. In some aspects, the consumer account 500 can access the metadata table stored in the client metadata storage 614 to confirm the consumer account is enabled (e.g., via the "enabled" flag).

The consumer_log_share_check stored procedure 608 checks for the log share from the consumer account 500 (e.g., via share 514). If a database is not already created from the consumer's share, then this procedure calls the enable_consumer stored procedure 610. The consumer_log_share_check stored procedure 608 uses the parameter account_locator (VARCHAR), which includes locator information for the consumer account 500.

The enable_consumer stored procedure 610 enables a consumer for identity resolution/enrichment, once the consumer has enabled sharing (e.g., sharing of application logs) to the provider account 600. This procedure can add additional metadata values to the metadata table in the client metadata storage 614. The enable_consumer stored procedure 610 uses the parameter account_locator (VARCHAR), which includes locator information for the consumer account 500.

At operation 5, once enabled, the consumer account 500 can resolve/enrich data by calling a generate_request helper stored procedure, which activates the enrich_records stored procedure 504. The enrich_records stored procedure 504 is shared with the app 502 that allows the consumer to enrich_records in the specified table with data from the provider account (e.g., source data 622 and external source data 624) when matched on a specified join key. The enrich_records stored procedure 504 can be used to resolve or enrich data from input table 522 and generate results in output table 528 (also referred to as result table 528). In some aspects, the enrich_records stored procedure 504 uses the following parameters:
  (a) account_locator (VARCHAR)—locator information for the consumer account 500;
  (b) request_id (VARCHAR)—the request's unique identifier;
  (c) input_table_name (VARCHAR)—the consumer's input table containing data to be enriched;
  (d) match_key (VARCHAR)—the field to join the consumer's data to the provider's data;
  (e) results_table_name (VARCHAR)—the results table to be created and shared to the consumer account or a result table stored in the consumer account (e.g., result table 528); and
  (f) template_name (VARCHAR)—the query template used to construct the approved query used to access the consumer's data.

To protect consumers, the application framework of FIGS. 5-6 configured by the IRE manager 130 may not allow the app 502 to write data from the consumer account 500 back to the provider account 600. As a result, local app logs cannot be written back to the provider account 600. As a workaround, during the provisioning process, the consumer account creates a share 514 to the provider account 600, along with a stream/tasks to write new log messages to a log table (e.g., in the application log database 512) shared with the provider. During the consumer account enablement process, the provider creates a database from the consumer's log share, processes the consumer's logs, and inserts them into a master log table (e.g., stored in the application logs storage 616). Each log/job table entry can be uniquely signed by provider-specific encryption (e.g., using the sign_log function 612). This signature (e.g., hash) is verified by the provider, to ensure logs are not tampered with. If log tampering is detected, the consumer's access to app 502 is revoked. If at any time the Consumer either drops the log share or removes the provider from the share, the provider automatically detects the lost share and disables the consumer.

For example, app 502 can generate one or more logs, including log 532 (associated with the log_share stored procedure 506), log 534 (associated with the installer stored procedure 508), or any other logs generated by app 502. The app_log stored procedure 510 can be configured with usage privileges 520 of the sign_log function 612 at the provider account 600. The sign_log function 612 is used for generating a hash (or a secure key) of a log generated by app 502. The app_log stored procedure 510 then updates (or revises) the log to include the generated hash, to obtain a signed log 536. The signed log 536 is stored in the application log database 512 and is shared with the provider account 600 via share 514.

At the provider account 600, the consumer_log_share_check stored procedure 608 detects the signed log 536 via the share 514 and calls the verify_logs stored procedure 604. The verify_logs stored procedure 604 retrieves the hash from the signed log 536, generates a new hash using the log data in the signed log, and compares the new hash to the original hash generated before sharing the log data. If the two hashes match, a determination is made that the log data has not been tampered with, and the log data is stored in the application logs storage 616. If the two hashes do not match, a determination is made that the log data has been tampered with at the consumer account 500. The tampered log data is stored in failed logs storage 618.

In some aspects, a request for identity resolution or data enrichment may contain several levels of resolution or enrichment. In this regard, a request for identity resolution or data enrichment is also referred to as a "job". Verified log data for a job can be stored in the application jobs storage 620. In some aspects, a job can be associated with different processing stages (e.g., multiple enrichment stages for an enrichment request) which are bundled to form the job In some aspects, app 502 is granted a temporary role that has read access privileges 524 (e.g., to retrieve input data from input table 522), read access privileges 518 (e.g., to access source data 622 and external source data 624 for identity resolution and data enrichment functions), and write access privileges 526 to store resolved/enriched data in the result table 528.

During an example enrichment operation, a consumer can create a task that calls the enrich_records stored procedure 504 when there is a change in the input table 522 (e.g., new or revised PII associated with a user). The enrich_records stored procedure 504 orchestrates the processing of each PII record for identity resolution or data enrichment. More specifically, the enrich_records stored procedure 504 can perform identity resolution based on the updated PII and using source data 622 or external source data 624.

During identity resolution, the enrich_records stored procedure 504 can match the updated PII from the input table 522 with existing identity-related data using source data 622 or external source data 624 to determine a user identity (or identity associated with a household of the user). The source data 622 or external source data 624 can include identity-related data for users and user households, as well as opt-out information associated with such users or user households.

During identity resolution, for each user/consumer PII record obtained from the input table 522, one or more secure identifiers (e.g., keys) can be generated by the enrich_records stored procedure 504. In some aspects, the int enrich_records stored procedure 504 further encrypts the generated one or more secure identifiers using a user-specific encryption passphrase. The one or more secure identifiers associated with the user are stored in the result table 528 at the data consumer account 500.

In some embodiments, after identity resolution is performed, the enrich_records stored procedure 504 can further perform data enrichment to generate additional data (also referred to as enrichment data) for the user (or the user's household) associated with the one or more secure identifiers generated during the identity resolution. More specifically, the enrich_records stored procedure 504 can use the source data 622 (which can include enrichment data for users and user households) to obtain enrichment data for the user (or the user's household) associated with the one or more secure identifiers generated during the identity resolution. In some aspects, the enrich_records stored procedure 504 further uses additional enrichment data (or matching logic) to perform data matching and obtain additional enrichment data (e.g., using one or more databases of the data provider or one or more external databases that the data provider has access to). The determined enrichment data can be stored in the result table 528 (or an additional result table).

In some aspects, the consumer account 500 can be configured with a merge/append function, which can be used to merge identity resolution data (as well as enrichment data if available) stored in the result table 528 with the PII stored in input table 522.

Figure 7:
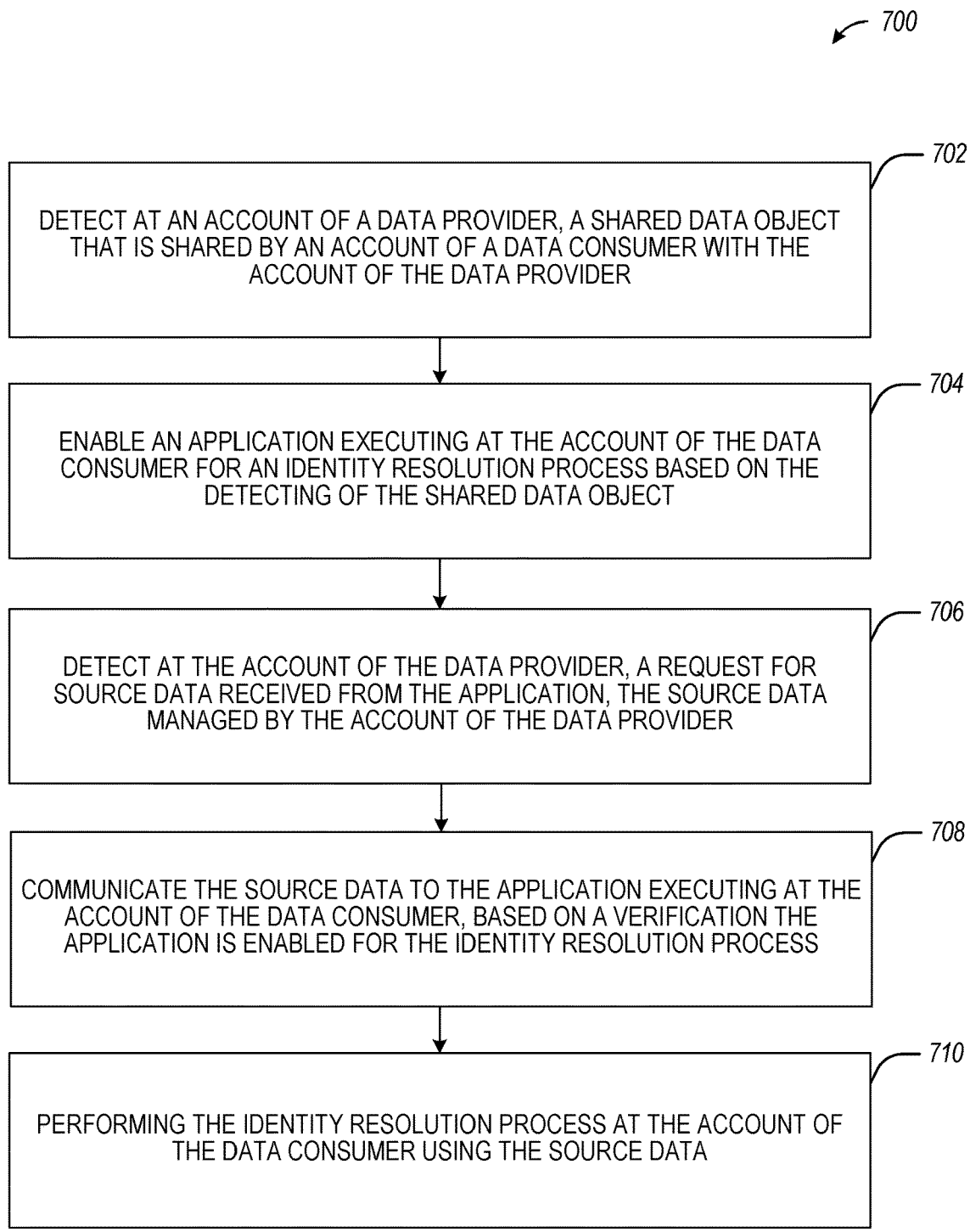
FIG. 7 is a flow diagram illustrating the operations of a database system in performing a method for identity resolution, in accordance with some embodiments of the present disclosure.

FIG. 7 is a flow diagram illustrating the operations of a database system in performing method 700 for identity resolution, in accordance with some embodiments of the present disclosure. Method 700 may be embodied in computer-readable instructions for execution by one or more hardware components (e.g., one or more processors) such that the operations of method 700 may be performed by components of network-based database system 102, such as components of the compute service manager 108 (e.g., the IRE manager 130) and/or the execution platform 110 (e.g., which components may be implemented as machine 800 of FIG. 8). Accordingly, method 700 is described below, by way of example with reference thereto. However, it shall be appreciated that method 700 may be deployed on various other hardware configurations and is not intended to be limited to deployment within the network-based database system 102.

At operation 702, a shared data object is detected at an account of a data provider. For example, the consumer_log_share_check stored procedure 608 is used to detect a shared signed log 536 stored in the application log database of the consumer account 500. The signed log 536 is shared by the consumer account 500 with the provider account 600 via share 514.

At operation 704, an application executing at the account of the data consumer is enabled for an identity resolution process based on the detecting of the shared data object. For example, after the consumer_log_share_check stored procedure 608 detects the signed log 536 shared by the consumer account 500 via share 514, the enable_consumer stored procedure 610 is executed to enable the consumer account 500 to use app 502 for identity resolution and data enrichment functions.

At operation 706, a request for source data is detected at the provider account 600. The request is received from app 502. For example, the enrich_records stored procedure 504 uses the read access privileges 518 to request (or obtain) source data (e.g., source data 622) managed by the provider account 600.

At operation 708, the source data is communicated to the application executing at the account of the data consumer. For example, after the verify_logs stored procedure 604 successfully verifies the shared signed log 536, the obtained source data is communicated back to the enrich_records stored procedure 504 (or the enrich_records stored procedure 504 is provided access to the requested source data).

At operation 710, the identity resolution process is performed at the account of the data consumer using the source data. For example, the enrich_records stored procedure 504 performs identity resolution or data enrichment using the obtained source data. The resolved or enriched data is stored in the result table 528. A notification of the resolved or enriched data is also communicated by the account of the data consumer (e.g., to a user device of a user of the consumer account 500).

Figure 8:
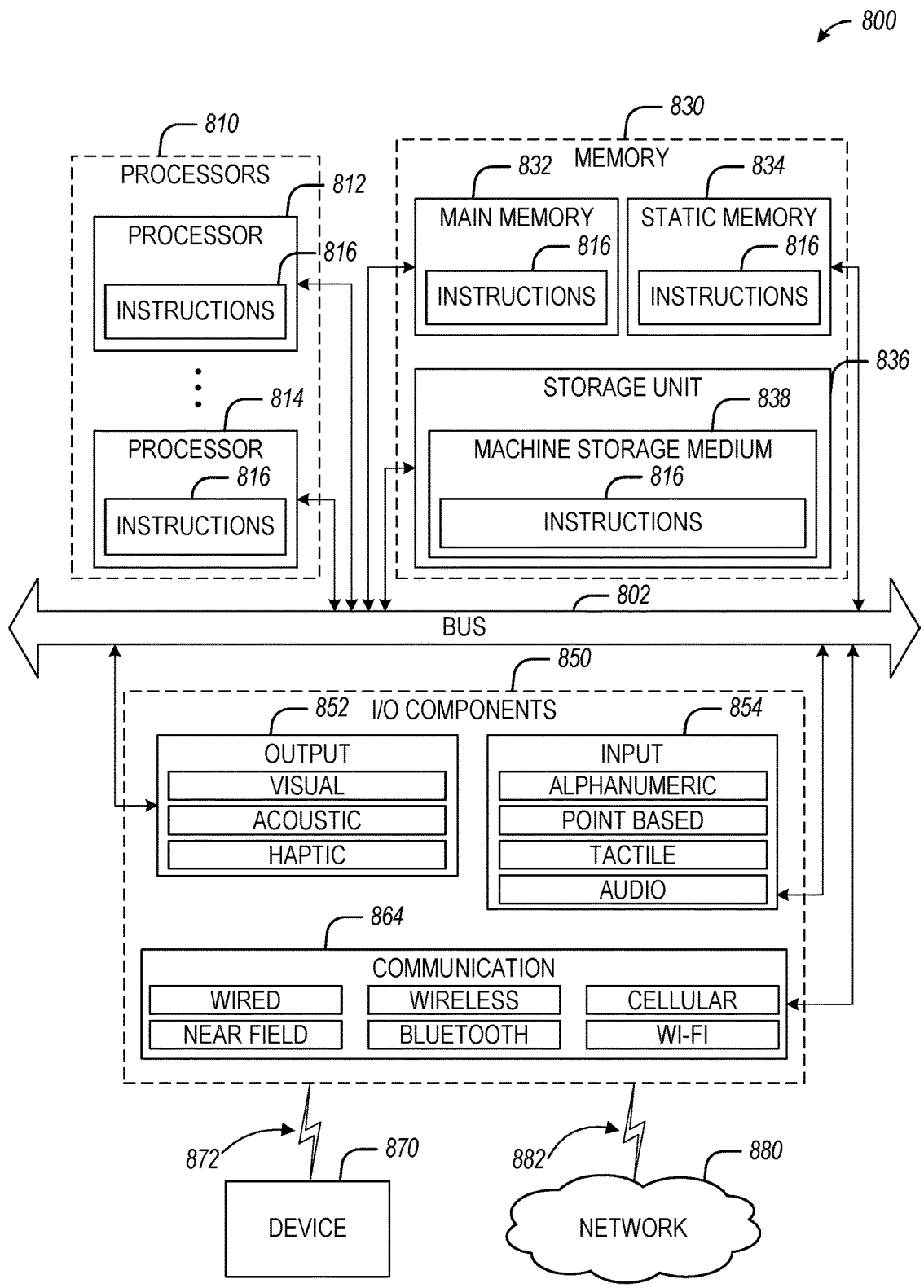
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of machine 800 in the example form of a computer system, within which instructions 816 (e.g., software, a program, an application, an applet, an app, or other executable code) for causing the machine 800 to perform any one or more of the methodologies discussed herein may be executed. For example, instructions 816 may cause machine 800 to execute any one or more operations of method 700 (or any other technique discussed herein, for example in connection with FIG. 4-FIG. 7). As another example, instructions 816 may cause machine 800 to implement one or more portions of the functionalities discussed herein. In this way, instructions 816 may transform a general, non-programmed machine into a particular machine 800 (e.g., the compute service manager 108 or a node in the execution platform 110) that is specially configured to carry out any one of the described and illustrated functions in the manner described herein. In yet another embodiment, instructions 816 may configure the compute service manager 108 and/or a node in the execution platform 110 to carry out any one of the described and illustrated functions in the manner described herein.

In alternative embodiments, the machine 800 operates as a standalone device or may be coupled (e.g., networked) to other machines. In a networked deployment, machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

Machine 800 includes processors 810, memory 830, and input/output (I/O) components 850 configured to communicate with each other such as via a bus 802. In some example embodiments, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within machine storage medium 838 of the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touches gestures or other tactile input components), audio input components (e.g., a microphone), and the like.

Communication may be implemented using a wide variety of technologies. The I/O components 850 may include communication components 864 operable to couple the machine 800 to a network 880 or device 870 via a coupling 882 and a coupling 872, respectively. For example, the communication components 864 may include a network interface component or another suitable device to interface with the network 880. In further examples, communication components 864 may include wired communication components, wireless communication components, cellular communication components, and other communication components to provide communication via other modalities. The device 870 may be another machine or any of a wide variety of peripheral devices (e.g., a peripheral device coupled via a universal serial bus (USB)). For example, as noted above, machine 800 may correspond to any one of the compute service manager 88 or the execution platform 110, and device 870 may include the client device 114 or any other computing device described herein as being in communication with the network-based database system 102, the storage platform 104, or the cloud storage platforms 122.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, network 880 or a portion of network 880 may include a wireless or cellular network, and coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of several well-known transfer protocols (e.g., hypertext transfer protocol (HTTP)). Similarly, instructions 816 may be transmitted or received using a transmission medium via coupling 872 (e.g., a peer-to-peer coupling) to device 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of some of the operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: detecting, at an account of a data provider, a shared data object that is shared by an account of a data consumer with the account of the data provider; enabling an application executing at the account of the data consumer for an identity resolution process based on the detecting of the shared data object; detecting at the account of the data provider, a request for source data received from the application, the source data being managed by the account of the data provider; communicating the source data to the application executing at the account of the data consumer based on a verification that the application is enabled for the identity resolution process; and performing the identity resolution process at the account of the data consumer using the source data.

In Example 2, the subject matter of Example 1 includes subject matter where the performing of the identity resolution process comprises: granting a record enrichment stored procedure of the application, write access privileges to a result data table stored at the account of the data consumer; granting the record enrichment stored procedure, first read access privileges to an input data table stored at the account of the data consumer; and granting the record enrichment stored procedure, second read access privileges to the source data managed by the account of the data provider.

In Example 3, the subject matter of Example 2 includes, the operations further comprising: retrieving by the record enrichment stored procedure, personally identifiable information (PII) from the input data table, using the first read access privileges.

In Example 4, the subject matter of Example 3 includes, the operations further comprising: generating, by the record enrichment stored procedure, a secure identifier of a user associated with the PII based on the source data; and updating, by the record enrichment stored procedure, the result data table with the secure identifier using the write access privileges.

In Example 5, the subject matter of Examples 1-4 includes, the operations further comprising: generating an application log of the application, the application log being based on one or more functions performed by the application during the identity resolution process.

In Example 6, the subject matter of Example 5 includes, the operations further comprising: generating at the account of the data provider, a first hash of the application log using a hash function; and revising the application log with the first hash to generate a revised application log.

In Example 7, the subject matter of Example 6 includes, the operations further comprising: sharing the revised application log with the account of the data provider using the shared data object.

In Example 8, the subject matter of Example 7 includes, the operations further comprising: retrieving the application log at the account of the data provider using the revised application log; and generating at the account of the data provider, a second hash using the hash function and the application log.

In Example 9, the subject matter of Example 8 includes, the operations further comprising: disabling the application executing at the account of the data consumer for the identity resolution process when the first hash is different from the second hash.

In Example 10, the subject matter of Examples 8-9 includes, the operations further comprising: incrementing a counter stored in a metadata database of the account of the data provider when the first hash is different from the second hash, the counter indicating a number of records stored at the account of the data consumer on which the identity resolution process is performed; and disabling the application executing at the account of the data consumer for the identity resolution process when the number of records exceeds a threshold number of records stored in the metadata database.

Example 11 is a method comprising: performing, by at least one hardware processor, operations comprising: detecting, at an account of a data provider, a shared data object that is shared by an account of a data consumer with the account of the data provider; enabling an application executing at the account of the data consumer for an identity resolution process based on the detecting of the shared data object; detecting, at the account of the data provider, a request for source data received from the application, the source data being managed by the account of the data provider; communicating the source data to the application executing at the account of the data consumer based on a verification that the application is enabled for the identity resolution process; and performing the identity resolution process at the account of the data consumer using the source data.

In Example 12, the subject matter of Example 11 includes subject matter where the performing of the identity resolution process comprises: granting a record enrichment stored procedure of the application, write access privileges to a result data table stored at the account of the data consumer; granting the record enrichment stored procedure, first read access privileges to an input data table stored at the account of the data consumer; and granting the record enrichment stored procedure, second read access privileges to the source data managed by the account of the data provider.

In Example 13, the subject matter of Example 12 includes, retrieving by the record enrichment stored procedure, personally identifiable information (PII) from the input data table, using the first read access privileges.

In Example 14, the subject matter of Example 13 includes, generating, by the record enrichment stored procedure, a secure identifier of a user associated with the PII based on the source data; and updating, by the record enrichment stored procedure, the result data table with the secure identifier using the write access privileges.

In Example 15, the subject matter of Examples 11-14 includes, generating an application log of the application, the application log being based on one or more functions performed by the application during the identity resolution process.

In Example 16, the subject matter of Example 15 includes, generating at the account of the data provider, a first hash of the application log using a hash function; and revising the application log with the first hash to generate a revised application log.

In Example 17, the subject matter of Example 16 includes, the operations further comprising: sharing the revised application log with the account of the data provider using the shared data object.

In Example 18, the subject matter of Example 17 includes, retrieving the application log at the account of the data provider using the revised application log; and generating at the account of the data provider, a second hash using the hash function and the application log.

In Example 19, the subject matter of Example 18 includes, disabling the application executing at the account of the data consumer for the identity resolution process when the first hash is different from the second hash.

In Example 20, the subject matter of Examples 18-19 includes, incrementing a counter stored in a metadata database of the account of the data provider when the first hash is different from the second hash, the counter indicating a number of records stored at the account of the data consumer on which the identity resolution process is performed; and disabling the application executing at the account of the data consumer for the identity resolution process when the number of records exceeds a threshold number of records stored in the metadata database.

Example 21 is a computer-storage medium comprising instructions that, when executed by one or more processors of a machine, configure the machine to perform operations comprising: detecting, at an account of a data provider, a shared data object that is shared by an account of a data consumer with the account of the data provider; enabling an application executing at the account of the data consumer for an identity resolution process based on the detecting of the shared data object; detecting, at the account of the data provider, a request for source data received from the application, the source data being managed by the account of the data provider; communicating the source data to the application executing at the account of the data consumer based on a verification that the application is enabled for the identity resolution process; and performing the identity resolution process at the account of the data consumer using the source data.

In Example 22, the subject matter of Example 21 includes subject matter where the performing of the identity resolution process comprises: granting a record enrichment stored procedure of the application, write access privileges to a result data table stored at the account of the data consumer; granting the record enrichment stored procedure, first read access privileges to an input data table stored at the account of the data consumer; and granting the record enrichment stored procedure, second read access privileges to the source data managed by the account of the data provider.

In Example 23, the subject matter of Example 22 includes, the operations further comprising: retrieving by the record enrichment stored procedure, personally identifiable information (PII) from the input data table, using the first read access privileges.

In Example 24, the subject matter of Example 23 includes, the operations further comprising: generating, by the record enrichment stored procedure, a secure identifier of a user associated with the PII based on the source data; and updating, by the record enrichment stored procedure, the result data table with the secure identifier using the write access privileges.

In Example 25, the subject matter of Examples 21-24 includes, the operations further comprising: generating an application log of the application, the application log being based on one or more functions performed by the application during the identity resolution process.

In Example 26, the subject matter of Example 25 includes, the operations further comprising: generating at the account of the data provider, a first hash of the application log using a hash function; and revising the application log with the first hash to generate a revised application log.

In Example 27, the subject matter of Example 26 includes, the operations further comprising: sharing the revised application log with the account of the data provider using the shared data object.

In Example 28, the subject matter of Example 27 includes, the operations further comprising: retrieving the application log at the account of the data provider using the revised application log; and generating at the account of the data provider, a second hash using the hash function and the application log.

In Example 29, the subject matter of Example 28 includes, the operations further comprising: disabling the application executing at the account of the data consumer for the identity resolution process when the first hash is different from the second hash.

In Example 30, the subject matter of Examples 28-29 includes, the operations further comprising: incrementing a counter stored in a metadata database of the account of the data provider when the first hash is different from the second hash, the counter indicating a number of records stored at the account of the data consumer on which the identity resolution process is performed; and disabling the application executing at the account of the data consumer for the identity resolution process when the number of records exceeds a threshold number of records stored in the metadata database.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
   detecting, at an account of a data provider, a shared data object that is shared by an account of a data consumer with the account of the data provider;
   enabling an application executing at the account of the data consumer for an identity resolution process based on detecting log data of the application is stored in the shared data object;
   detecting, at the account of the data provider, a request for source data received from the application, the source data being managed by the account of the data provider;
   communicating the source data to the application executing at the account of the data consumer based on a verification that the application is enabled for the identity resolution process, the verification based on detecting using the log data of the application is stored in the shared data object and is signed by a hash function of the data provider;
   generating an application log of the application as the log data, the application log being based on one or more functions performed by the application during the identity resolution process;
   generating at the account of the data provider, a first hash of the application log using a hash function;
   revising the application log with the first hash to generate a revised application log; and
   performing the identity resolution process at the account of the data consumer using the source data.

2. The system of claim 1, wherein the performing of the identity resolution process comprises:
   granting a record enrichment stored procedure of the application, write access privileges to a result data table stored at the account of the data consumer;
   granting the record enrichment stored procedure, first read access privileges to an input data table stored at the account of the data consumer; and
   granting the record enrichment stored procedure, second read access privileges to the source data managed by the account of the data provider.

3. The system of claim 2, the operations further comprising:
   retrieving by the record enrichment stored procedure, personally identifiable information (PII) from the input data table, using the first read access privileges.

4. The system of claim 3, the operations further comprising:
   generating, by the record enrichment stored procedure, a secure identifier of a user associated with the PII based on the source data; and
   updating, by the record enrichment stored procedure, the result data table with the secure identifier using the write access privileges.

5. The system of claim 1, the operations further comprising:
   sharing the revised application log with the account of the data provider using the shared data object.

6. The system of claim 5, the operations further comprising:
   retrieving the application log at the account of the data provider using the revised application log; and
   generating at the account of the data provider, a second hash using the hash function and the application log.

7. The system of claim 6, the operations further comprising:
   disabling the application executing at the account of the data consumer for the identity resolution process when the first hash is different from the second hash.

8. The system of claim 6, the operations further comprising:
   incrementing a counter stored in a metadata database of the account of the data provider when the first hash is different from the second hash, the counter indicating a number of records stored at the account of the data consumer on which the identity resolution process is performed; and disabling the application executing at the account of the data consumer for the identity resolution process when the number of records exceeds a threshold number of records stored in the metadata database.

9. A method comprising:

performing, by at least one hardware processor, operations comprising:

detecting, at an account of a data provider, a shared data object that is shared by an account of a data consumer with the account of the data provider;

enabling an application executing at the account of the data consumer for an identity resolution process based on detecting log data of the application is stored in the shared data object;

detecting, at the account of the data provider, a request for source data received from the application, the source data being managed by the account of the data provider;

communicating the source data to the application executing at the account of the data consumer based on a verification that the application is enabled for the identity resolution process, the verification based on detecting the log data of the application is stored in the shared data object and is signed by a hash function of the data provider;

generating an application log of the application as the log data, the application log being based on one or more functions performed by the application during the identity resolution process;

generating at the account of the data provider, a first hash of the application log using a hash function;

revising the application log with the first hash to generate a revised application log; and performing the identity resolution process at the account of the data consumer using the source data.

10. The method of claim 9, wherein the performing of the identity resolution process comprises:

granting a record enrichment stored procedure of the application, write access privileges to a result data table stored at the account of the data consumer;

granting the record enrichment stored procedure, first read access privileges to an input data table stored at the account of the data consumer; and granting the record enrichment stored procedure, second read access privileges to the source data managed by the account of the data provider.

11. The method of claim 10, further comprising:

retrieving by the record enrichment stored procedure, personally identifiable information (PII) from the input data table, using the first read access privileges.

12. The method of claim 11, further comprising:

generating, by the record enrichment stored procedure, a secure identifier of a user associated with the PII based on the source data; and updating, by the record enrichment stored procedure, the result data table with the secure identifier using the write access privileges.

13. The method of claim 9, the operations further comprising:

sharing the revised application log with the account of the data provider using the shared data object.

14. The method of claim 13, further comprising:

retrieving the application log at the account of the data provider using the revised application log; and generating at the account of the data provider, a second hash using the hash function and the application log.

15. The method of claim 14, further comprising:

disabling the application executing at the account of the data consumer for the identity resolution process when the first hash is different from the second hash.

16. The method of claim 14, further comprising:

incrementing a counter stored in a metadata database of the account of the data provider when the first hash is different from the second hash, the counter indicating a number of records stored at the account of the data consumer on which the identity resolution process is performed; and disabling the application executing at the account of the data consumer for the identity resolution process when the number of records exceeds a threshold number of records stored in the metadata database.

17. A computer-storage medium comprising instructions that, when executed by one or more processors of a machine, configure the machine to perform operations comprising:

detecting, at an account of a data provider, a shared data object that is shared by an account of a data consumer with the account of the data provider;

enabling an application executing at the account of the data consumer for an identity resolution process based on detecting log data of the application is stored in the shared data object;

detecting, at the account of the data provider, a request for source data received from the application, the source data being managed by the account of the data provider;

communicating the source data to the application executing at the account of the data consumer based on a verification that the application is enabled for the identity resolution process, the verification based on detecting the log data of the application is stored in the shared data object and is signed by a hash function of the data provider;

generating an application log of the application as the log data, the application log being based on one or more functions performed by the application during the identity resolution process;

generating at the account of the data provider, a first hash of the application log using a hash function;

revising the application log with the first hash to generate a revised application log; and performing the identity resolution process at the account of the data consumer using the source data.

18. The computer-storage medium of claim 17, wherein the performing of the identity resolution process comprises:

granting a record enrichment stored procedure of the application, write access privileges to a result data table stored at the account of the data consumer;

granting the record enrichment stored procedure, first read access privileges to an input data table stored at the account of the data consumer; and granting the record enrichment stored procedure, second read access privileges to the source data managed by the account of the data provider.

19. The computer-storage medium of claim 18, the operations further comprising:

retrieving by the record enrichment stored procedure, personally identifiable information (PII) from the input data table, using the first read access privileges.

20. The computer-storage medium of claim 19, the operations further comprising:
  generating, by the record enrichment stored procedure, a secure identifier of a user associated with the PII based on the source data; and
  updating, by the record enrichment stored procedure, the result data table with the secure identifier using the write access privileges.

21. The computer-storage medium of claim 17, the operations further comprising:
  sharing the revised application log with the account of the data provider using the shared data object.

22. The computer-storage medium of claim 21, the operations further comprising:
  retrieving the application log at the account of the data provider using the revised application log; and
  generating at the account of the data provider, a second hash using the hash function and the application log.

23. The computer-storage medium of claim 22, the operations further comprising:
  disabling the application executing at the account of the data consumer for the identity resolution process when the first hash is different from the second hash.

24. The computer-storage medium of claim 22, the operations further comprising:
  incrementing a counter stored in a metadata database of the account of the data provider when the first hash is different from the second hash, the counter indicating a number of records stored at the account of the data consumer on which the identity resolution process is performed; and
  disabling the application executing at the account of the data consumer for the identity resolution process when the number of records exceeds a threshold number of records stored in the metadata database.

\* \* \* \* \*

UNITED STATES PATENT AND TRADEMARK OFFICE
CERTIFICATE OF CORRECTION

| | | |
|---|---|---|
| PATENT NO. | : 11,954,229 B1 | Page 1 of 1 |
| APPLICATION NO. | : 18/161030 | |
| DATED | : April 9, 2024 | |
| INVENTOR(S) | : Henderson et al. | |

It is certified that error appears in the above-identified patent and that said Letters Patent is hereby corrected as shown below:

On the Title Page

On page 2, in Column 1, under "Other Publications", Line 7, delete "Resolutioin" and insert --Resolution-- therefor Signed and Sealed this
Seventeenth Day of June, 2025

Coke Morgan Stewart
*Acting Director of the United States Patent and Trademark Office*